(12) United States Patent
Hang et al.

(10) Patent No.: US 8,678,469 B2
(45) Date of Patent: Mar. 25, 2014

(54) LOCK AND ROLL UP TONNEAU COVER METHOD

(75) Inventors: Shi Hang, Changzhou (CN); Zheng Hongjuan, Changzhou (CN)

(73) Assignee: Vehicle Enhancement Labs, Bellflower, CA (US)

( * ) Notice: Subject to any disclaimer, the term of this patent is extended or adjusted under 35 U.S.C. 154(b) by 0 days.

(21) Appl. No.: 13/492,521

(22) Filed: Jun. 8, 2012

(65) Prior Publication Data

US 2013/0328347 A1     Dec. 12, 2013

(51) Int. Cl.
  *B60P 7/02* (2006.01)
(52) U.S. Cl.
  USPC ............... 296/100.17; 296/100.18; 296/98
(58) Field of Classification Search
  USPC ............... 296/100.18, 100.15, 100.17, 98
  See application file for complete search history.

(56) References Cited

U.S. PATENT DOCUMENTS

| | | | |
|---|---|---|---|
| 4,036,521 A | 7/1977 | Clenet | |
| 4,923,240 A * | 5/1990 | Swanson | 296/100.18 |
| 5,076,338 A | 12/1991 | Schmeichel et al. | |
| 5,906,407 A | 5/1999 | Schmeichel | |
| 6,293,608 B1 | 9/2001 | Dicke et al. | |
| 6,669,264 B1 * | 12/2003 | Tucker | 296/100.15 |
| 6,719,353 B1 * | 4/2004 | Isler et al. | 296/98 |
| 7,334,830 B2 | 2/2008 | Weldy | |
| 8,336,946 B2 * | 12/2012 | Schrader et al. | 296/100.15 |
| 2001/0020792 A1 * | 9/2001 | Huotari | 296/100.16 |
| 2012/0098293 A1 * | 4/2012 | Schmeichel et al. | 296/100.15 |

* cited by examiner

*Primary Examiner* — Joseph Pape
(74) *Attorney, Agent, or Firm* — Novak Druce Connolly Bove + Quigg LLP

(57) ABSTRACT

A soft top fabric cover supported by an internal frame work provides a removal end support rail in closest range to a cargo bed tail gate, contains a latch system which allows coupling or uncoupling of the fabric cover from both left and right side longitudinal rails. Further, both left and right longitudinal rails incorporate a full length downward angled slot which accepts an incorporated receiver located on the outer edges of the fabric cover. Upon tensioning, the fabric cover is securely coupled to its internal frame work.

17 Claims, 5 Drawing Sheets

LOCK AND ROLL UP TONNEAU COVER METHOD

BACKGROUND OF THE INVENTION

1. Field of the Invention

The present invention in general relates to vehicle cargo bed covers and more particularly to a lock and roll up method.

2. Background and Related Art

Tonneau covers have been used for a number of years and used to cover the cargo box of pickup trucks and protect its interior against dirt, debris and other environmental contaminants and in some cases to improve the aesthetic quality thereof. Originally tonneau covers were designed by upholstery shops and typically made of vinyl covered fabrics or canvas. The material was often doubled over along its edges for added strength and appearance. Male snaps were then attached to the sides of the cargo box via fasteners, while female snaps were attached along the edges of the cover. Wooden bows were sometimes used to span the cargo box and ensure that the cover remained high enough to drain water. Unfortunately these covers were sometimes difficult to handle, often led to corrosion around the snaps and occasionally failed to protect the cargo box.

Over the years a wide variety of cover designs have been developed, in general these covers are known as either "caps" or "tonneau covers." Caps are typically an enclosure that extends substantially above the bed so as to increase the height of the cargo bed while a tonneau cover typically lies substantially flush with the top walls of the cargo bed without significantly increasing the height of the cargo bed.

Most tonneau cover systems today are constructed of a solid or fabric material and employ an internal support frame work which installs to the cargo bed as a one piece system. Occasionally these systems can be hinged to provide an opening section thus providing access to the cargo bed or to stowed cargo. Clamp methods are often employed to allow alignment and installation of the cover system to the cargo bed or when on occasions it may be necessary to carry a load that exceeds the height limitations of the cover system, these clamps allow quick and easy removal from the cargo bed.

Many of these previous features were also incorporated in later designs with slight modifications. For example, U.S. Pat. No. 5,076,338, similar to U.S. Pat. No. 4,036,521 employed a pivoting rail to retain tightness of the tonneau cover material. In this particular system, an "L" shaped rail, which presumably puts the pivot lower for added mechanical advantage was used to tighten the tonneau cover material from a fore and aft position rather than cross-car position. This system further employed 45 degree angled frame rails and hook and loop system, known commercially under the trademark, VELCRO, as the fastener.

Relatively recently, a tonneau cover system having a screw adjustment mechanism was developed for permitting the fore and aft adjustment of the front rail. This screw adjustment mechanism serves to tighten the tonneau cover material in response to wear and to stretch that is common in tonneau cover systems. The tonneau cover system further employed the "L" shaped lever and lower-positioned pivot which requires the lever to carry an enormous amount of force. Consequently a stronger latch is required to overcome these loading forces and minimize wear and breakage. Frame rails coupled to the sidewalls of the cargo box using a plurality of clamps can be seen in U.S. Pat. No. 5,906,407 issued to Schmeichels. This disclosure of which is hereby incorporated and made a part of this application by reference.

A TRUXEDO cover which is not believed to be patented made by SHURCO includes a rotating, rectangular, rear rail having a rounded front pivot, vertical sides with VELCRO attachment and spring pins that push on a front rail mounted inboard of the side rails. These spring pins push against the front rail to tension the system in the fore-aft direction. The spring pins which are attached to the side rails via brackets may not firmly engage the front rail due to their inboard location which may cause the brackets to come out of alignment as the side rails rotate. Additionally the rounded shape of the front rails may cause the push pins to slip off-center. This disclosure of which is hereby incorporated and made part of this application by reference.

U.S. Pat. No. 6,293,608 issued to Dicke, discloses a tailgate rail interconnected to side rails with an interconnecting plate coupled to the side rails and slide able coupled to the corner piece for accommodating relative movement there between. A biasing device being a coil spring is further provided thus to provides tensioning to the tonneau fabric. This disclosure of which is hereby incorporated and made part of this application by reference.

U.S. Pat. No. 7,334,830 issued to Weldy, discloses a sectional tonneau cover having vertically suspended cam locks and having side to side adjustability provided for by slots in the frame. This disclosure of which is hereby incorporated and made part of this application by reference.

SUMMARY OF THE INVENTION

Accordly to the principles of the present invention, a tonneau cover system designed for a cargo box provides a weather-proof flexible fabric cover having an internal support frame consisting of two longitudinal side rails joined together by two end cross rails. This internal support frame positions adjacent to the top surface of the sidewalls of the cargo box so as to aid in the supporting and positioning of the fabric cover. A plurality of discrete position clamps having adjustability, allows the internal frame and cover to be aligned and mounted to the cargo bed.

A end support rail in closest contact to the cargo bed tail gate incorporates two spring loaded latches located at its most outer edges and are linked together by a common linkage. Coupling or uncoupling of this end support rail from both a left and right longitudinal rail is achieved when both longitudinal rails make provisions to house not only the end support rail but to receive its latching mechanisms as well.

Further, both left and right longitudinal rails incorporate full length downward angled slots which are designed to accept an incorporated receiver located on the outer edges of the fabric cover. When the end rail is uncoupled, detensioning of the fabric cover occurs and allowing the incorporated receivers to be removed from the longitudinal rail slots. The fabric cover is now capable of being rolled back and providing convenient access to the cargo bed.

The opposite end rail from the removal end rail provides fixed coupling of the fabric cover to the front facing internal support frame and further provides strapping to hold a rolled fabric cover.

Other objects, advantages and novel features of the present invention will become readily apparent from the following drawings and detailed description of the preferred embodiments.

DETAILED DESCRIPTION OF THE PREFERRED EMBODIMENTS

The following description of the preferred embodiments is merely exemplary in nature and is in no way intended to limit the invention; its application, or uses.

Figure 1:
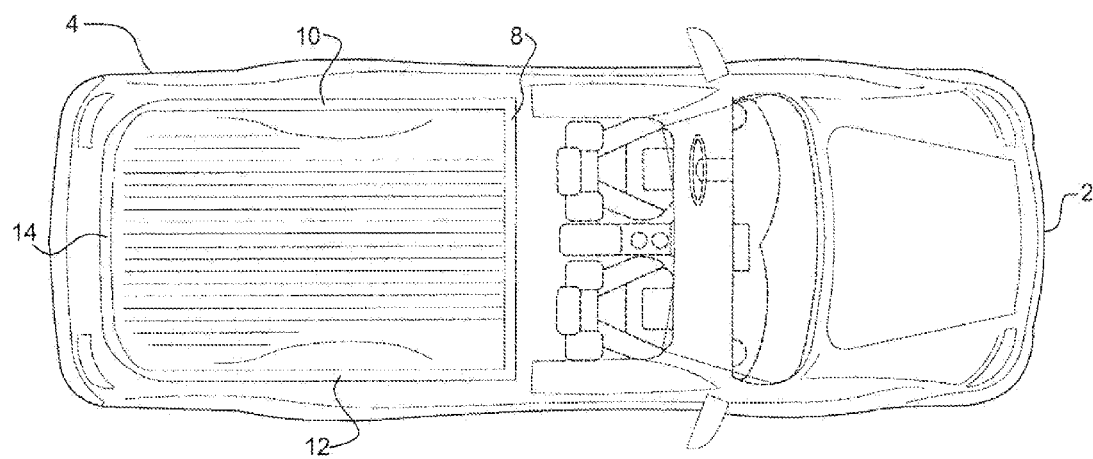
FIG. 1 illustrates a cargo bed and the wall structure.

With reference to FIG. 1, a pickup truck 2 is shown having a cargo bed 4 consisting of a front wall 6, an opening tail gate 8, a left wall 10, a right wall 12 and a tail gate wall 14. It should be understood these corresponding walls can provide support for an internal framework covered by a weather proof fabric.

Figure 2:
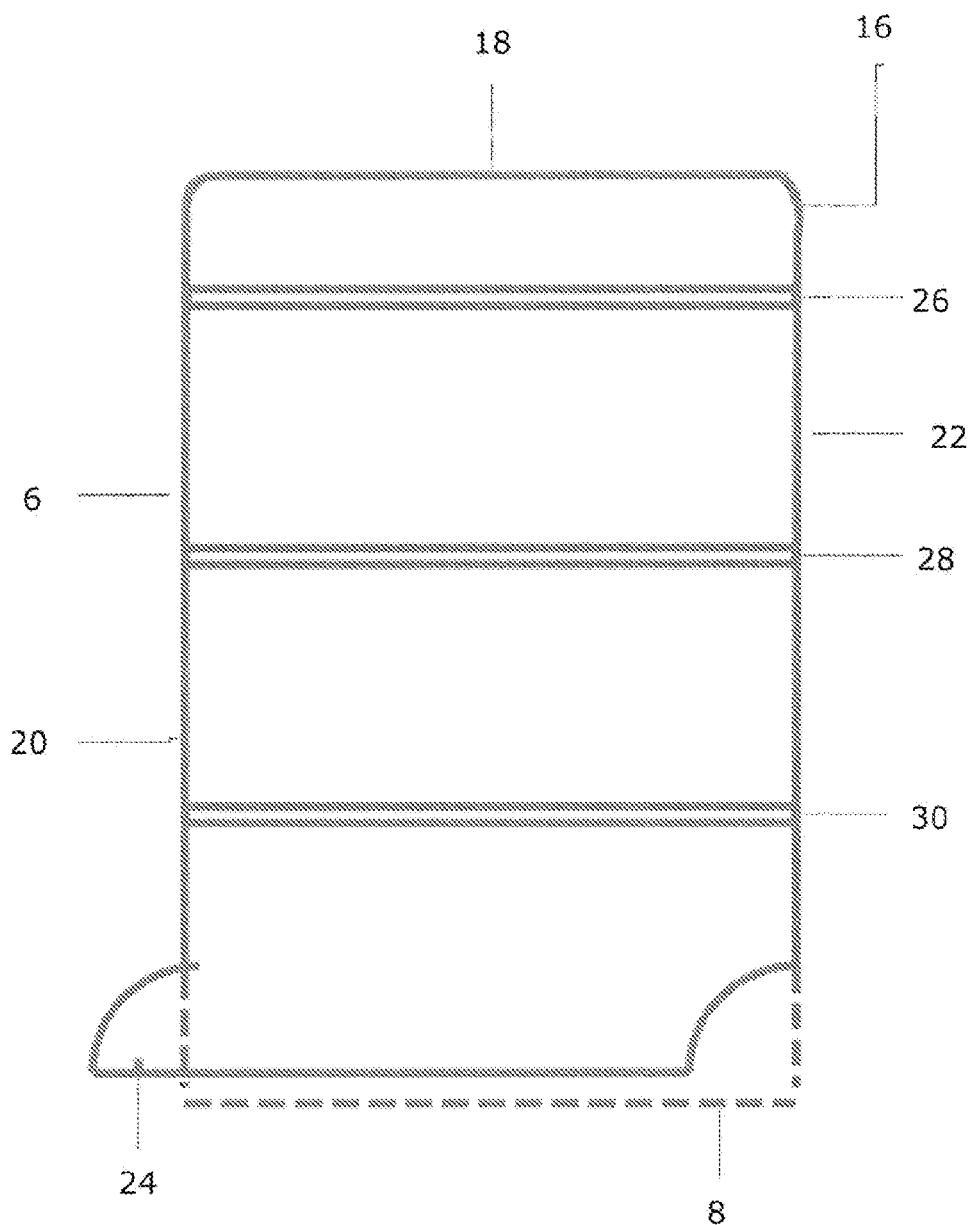
FIG. 2 illustrates a fabric cover, its internal support frame work framework and the relationship between a left and right longitudinal rails, a fixed in place end rail and a removal end rail.

With reference to FIG. 2, internal framework 16 is constructed to form a rigid rectangular support system for the fabric cover. This framework consists of a series of inter connecting rails, a front rail 18, left rail 20, right rail 22, a tail gate rear rail 24 and a series of cross support rails 26, 28 and 30. Tail gate rear cross rail 24 is removed from the side rails and is illustrated in a lifted position which allows access to the cargo bed. When rear cross rail 24 is re-coupled to both the left and right longitudinal rails 20 and 22, reforms the rigid rectangular frame support system for the fabric cover. Typically this rigid support frame is arranged in mirrored symmetry to the top walls of a particular vehicle year, make and model cargo bed.

Figure 3:
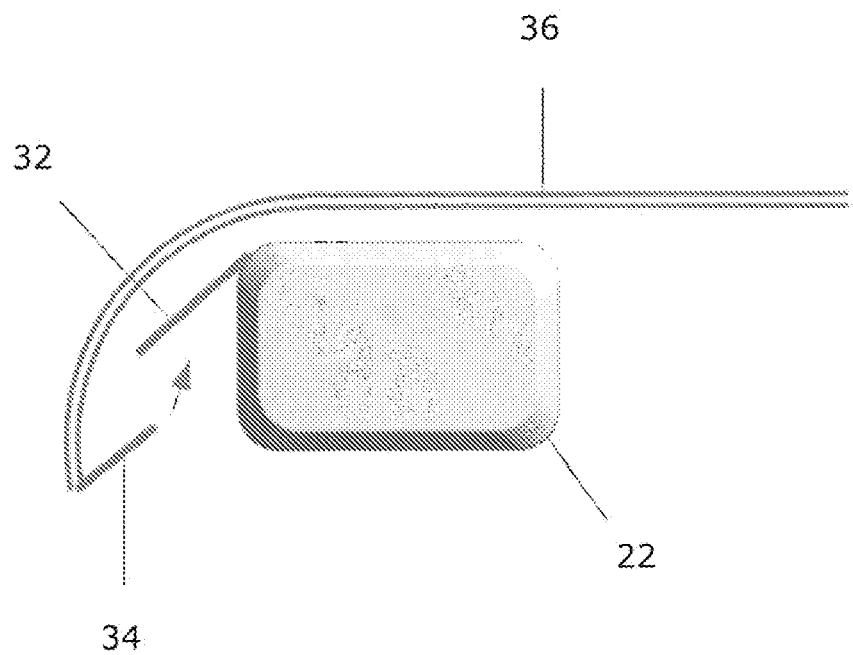
FIG. 3 illustrates longitudinal rails having downward angled receiver slots used to hold the fabric cover to the support framework.

With reference to FIG. 3, longitudinal rails 20 and 22 incorporate full length downward angled receiver slots 32 which are specifically designed to accept an incorporated as part of the fabric cover, a full length receiver 34. These downward slots are approximately the same width as the side wall of the longitudinal rail and are positioned to provide an angled tapering gap between the side wall and the outer surface slot wall. The widest point of the outward facing slot should be considered furthest away from the top surface of the longitudinal rail and from this low point, the gap starts to narrow as it moves upwards towards the top surface.

Incorporated towards the outer edges of the fabric cover 36 and also running in longitudinal order, are receivers 34 which are constructed from a flexible but a substantial more ridge material, such as hard rubber or plastic then the fabric cover material. Receivers 34 are fasten to the fabric cover in a lower position so as to have up and inward facing flexibility as opposed to the lower outer edges of the fabric cover. When upwards receiver 34 is received by the downwards angled slots 32, a fit in place is achieved between the fabric cover and the longitudinal frame rails.

Figure 4:
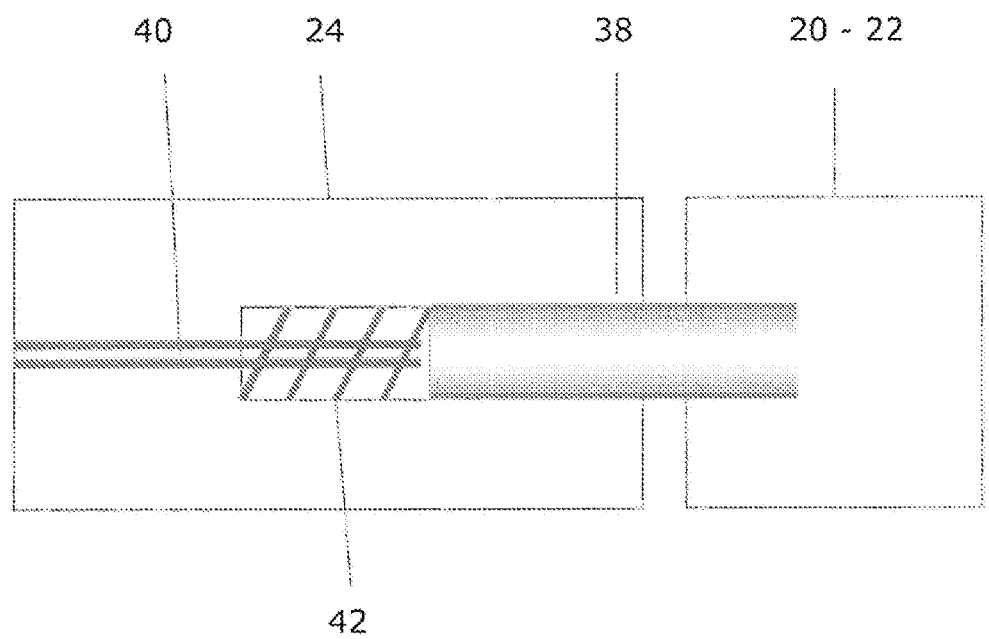
FIG. 4 illustrates longitudinal rails having locking latch receivers for a removal end rail.

In reference to FIG. 4, rear cross support rail 24 located nearest to the tail gate and can be accessed for removal via an incorporated spring loaded latching mechanism 38, which is housed internally within the support rail's outer edges and forms a latch in place relationship with side rails 20 and 22. Unlatching the cross support from the outer rails allows de-tensioning of the fabric cover with the unlatching process accomplished as simply illustrated in FIG. 4, a cable linkage 40 is tightly stretched and connects to the two outer spring loaded latches, once activated by a common linkage, the distance between the mechanisms decreases allowing the latching mechanisms and the rear cross support rail freedom from the two outer rails. In a reverse process, tensioning of the fabric cover is achieved once rear cross support rail 24 is installed and latched in place to longitudinal rails 20 and 22.

Figure 5:
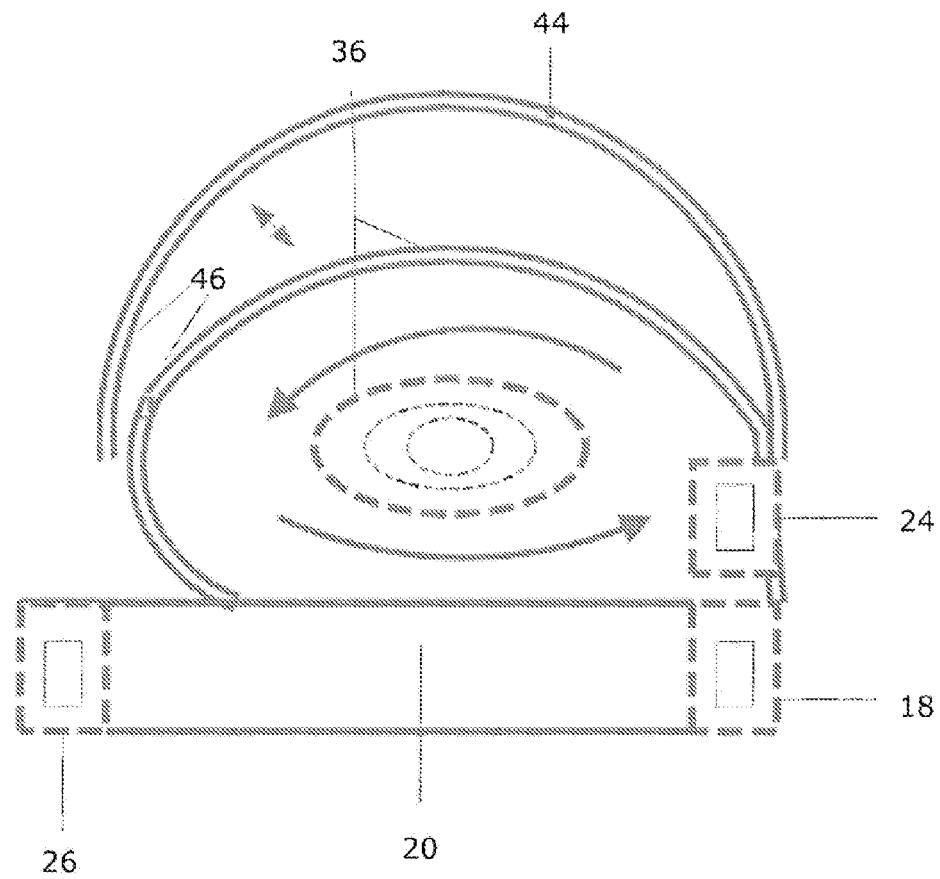
FIG. 5 illustrates the fabric cover in a rolled position and its relationship to the support frame and a strapping system.

In reference to FIG. 5, the fabric cover 36 is shown in a rolled position with the leading edge of the fabric cover 36 firmly attached to front cross rail 18. In the rolled position the fabric cover is supported by front cross rail 18 with partial support coming from both longitudinal rails 20 and 22. Fixed to front cross rail 18 is at least a pair of strapping systems 44 constructed of common strapping materials such as vinyl lined with Velcro VELCRO 46 or possibly attached to the end of the straps could be a simple mechanical method in similar to a belt buckle. Strapping system 44 is used to hold and prevent the cover from unraveling once in the rolled position. As illustrated FIG. 5, tailgate rear cross rail 24 takes part in the cover rolling up process as a fixed part of the fabric cover. Cross center support rails 26, 28 and 30 are typically spaced equally between both longitudinal rails and are removable to allow clear access to the cargo bed.

The description of the invention is merely exemplary in nature and thus, variations that do not depart from the gist of the invention are intended to be within the scope of the invention. Such variations are not to be regarded as a departure from the spirit and scope of the invention.

What is claimed is:

1. A fabric covering system for use on a vehicle cargo bed; which cargo bed comprises a left side wall and a right side wall, a front wall and a tail gate wall, which left side wall and right side wall, each accept and support an internal framework;
    a fabric covering system comprising the internal framework and a fabric;
    the internal framework being a rigid rectangular support comprising a series of interconnecting rails;
    the interconnecting rails comprising a front rail, a left rail, a right rail and a tail gate rail, and a series of cross support rails;
    the internal framework being retained onto the cargo bed by clamping the left rail to the left side wall, clamping the right rail to the right sidewall, and removably coupling the tail gate rail to and between the left rail and the right rail;
    the removably coupling comprising a spring loaded latching mechanism housed internally in outer edges of the tail gate rail so as to be operably latchable to the right rail and to the left rail by movement of a latch along a longitudinal axis of the tail gate rail transversely into at least one of the left side rail and the right side rail, and operatively unlatchable from at least one of the left side rail and right side rail by a reverse movement of the latch;
    the internal framework being spanned by the fabric cover;
    the fabric cover being attached to at least the front rail and the tail gate rail;
    the fabric cover being tensioned by coupling the tail gate rail to the left and right side rails, and de-tensioned by unlatching the tail gate rail from the left and right side rails.

2. The fabric covering system according to claim 1, wherein at least the right side and left side rails are configured to comprise downward facing slots each of which slots accepts at least two incorporated flexible receivers attached to the fabric cover and wherein the tail gate rail is removable from the left side and right side rails.

3. The fabric cover according to claim 2, wherein the tail gate rail houses two individual latching mechanisms located internally on opposing ends of the tail gate rail and the two individual latch mechanisms are coupled together by a common linkage.

4. The fabric covering system according to claim 3, wherein at least one of the right side rail and the left side rail are provided with slots to receive at least one of the two latching mechanisms of the tail gate rail and coupling or uncoupling of the fabric cover from the framework is controlled by unlatching the tail gate rail by overcoming a force exerted by the spring loaded latching mechanism, removing the tail gate rail from the right side rail and left side rail and removing the cover's flexible receivers from the right and left side rail's slots.

5. The fabric covering system according to claim 4, further comprising a strapping system attached to the front rail, which strapping system allows the fabric cover to be placed in a secure stored position adjacent the front rail.

6. The fabric covering system according to claim 2, wherein the front rail is rigidly attached to the right side rail and to the left side rail.

7. The fabric covering system of claim 1, further comprising a plurality of cross support members between the right side rail and left side rail and intermediate the front rail and the tail gate rail.

8. The fabric covering system of claim 2, wherein the fabric cover comprises a flexible fabric cover.

9. The fabric covering system of claim 8, wherein the receivers attached to the flexible cover are formed of a substantially more rigid material than the flexible fabric cover.

10. The fabric covering system of claim 9, wherein the receivers are fastened to the flexible fabric cover at a lowermost position of the fabric cover so as to have upward and inward facing relationship with respect to the flexible fabric cover.

11. The fabric covering system of claim 10, wherein the right side rail and left side rail each incorporate a downwardly angled slot to accept the receivers.

12. The fabric covering system of claim 11, wherein the downwardly angled slot extends the full length of the right and left side rails.

13. The fabric covering system of claim 7, wherein the cross support members are removable from the right side rail and left side rail.

14. The fabric covering system of claim 4, wherein a strapping system is fixed to the front rail.

15. The fabric covering system according to claim 2, wherein the latching mechanism is spring loaded so as to force the latching mechanism outward of the tail gate rail.

16. The fabric covering system according to claim 3, wherein each of the two latching mechanisms is spring loaded so as to force each of the two latching mechanisms outward of the tail gate rail.

17. The fabric covering system according to claim 16, wherein the common linkage is a tightly stretched cable linkage.

* * * * *